United States Patent Office 3,181,174
Patented Apr. 27, 1965

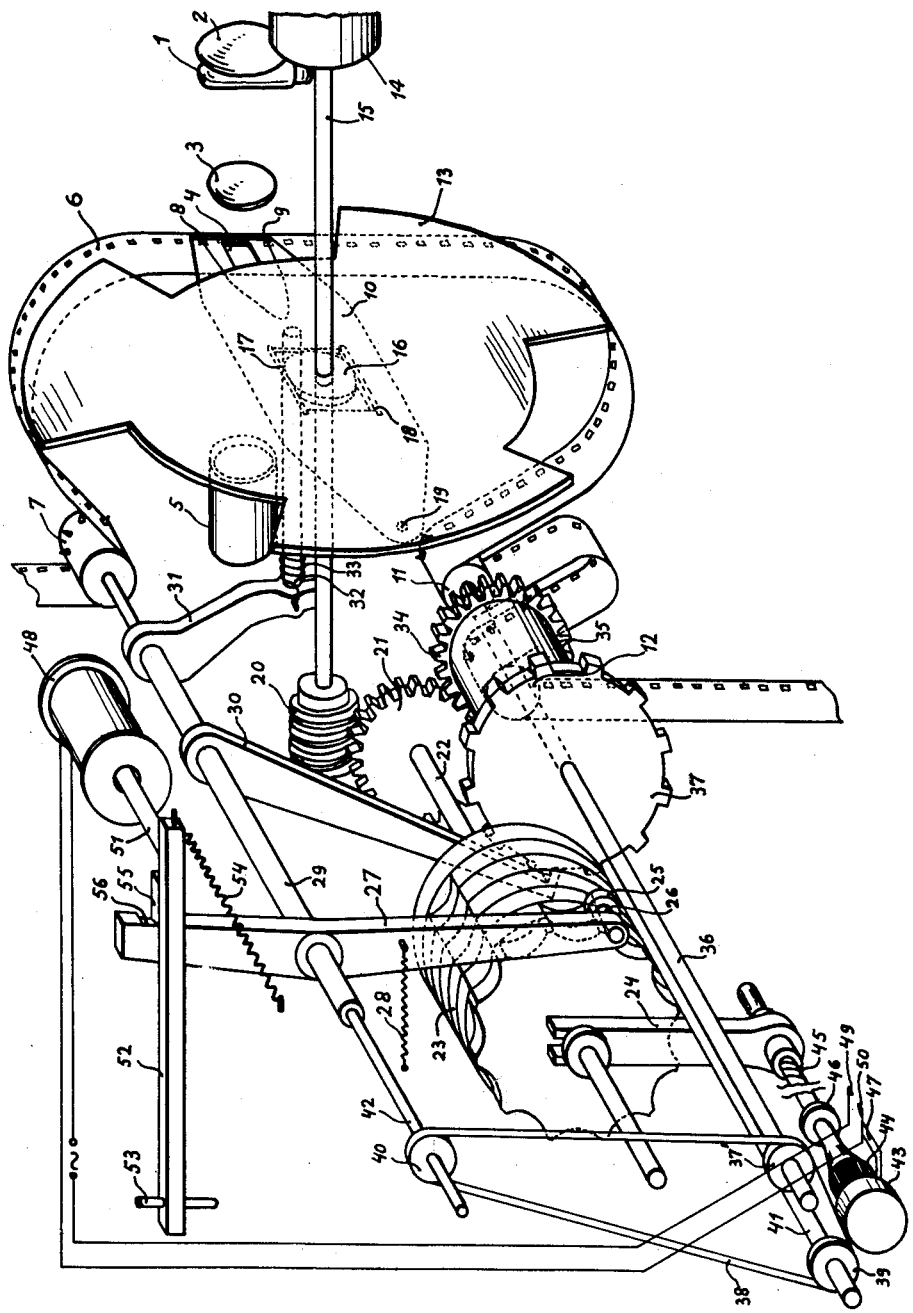

3,181,174
VARIABLE INTERMITTENT FILM ADVANCING MEANS
Jan Griffioen, Farmingdale, N.Y., and Roelof Bok, Hengelo, Netherlands, assignors to N.V. Optische Industrie "De Oude Delft," Delft, Netherlands
Filed July 18, 1962, Ser. No. 210,682
Claims priority, application Netherlands, July 21, 1961, 267,377
6 Claims. (Cl. 352—180)

The invention relates to cinematographic projectors and, more particularly, to a projector which is provided with a rotatable shutter having one or more blades to periodically interrupt the light beam and a film feed mechanism, adapted to periodically move the film past the film gate a length corresponding to one picture frame.

It has become known for such projectors to provide means to vary the frequency of the intermittent film motion without changing at the same time the speed of the driving motor which determines the frequency at which the shutter blades intercept the light. For the purpose of this specification the frequency of the intermittent film motion will be termed the frame frequency, whereas the interruption frequency of the shutter will be termed flicker frequency. Usually, in order to reduce the effect of flicker to below the visible threshold, the flicker frequency will be kept considerably higher than the frame frequency, e.g. by providing a shutter having a sufficient number of blades. The variation of the frame frequency is brought about, in a known projector, by providing a speed selecting device which allows the film feed mechanism to become operative only in periodic intervals whose period is a multiple of the period of film motion at the highest film speed. In this way, a step-wise control of the frame frequency is obtained. The flicker frequency, however, is maintained constant since the motor speed is not varied.

The known projector uses a claw for producing the intermittent film motion having pins for engaging the film perforations, which claw is movable in a direction to and away from the film as well as in the length direction of the film. The speed selecting device consists of an assembly of cam discs having different numbers of cams, said discs being mounted for simultaneous continuous rotation on a shaft which is driven in synchronism with the shutter. Each of the discs can be selected for co-operation with a lever which senses the profile of the cam discs and controls the motion of the claw pins to and away from the film, whereas the claw motion in the direction along the film is directly derived from the shutter shaft. The invention relates to a projector of the type described in which, exclusively or in combination with a claw mechanism, one or more sprocket wheels are used for producing the intermittent motion of the film. It is one object of the invention to provide simple and reliable means to derive the required intermittent rotation with variable frequency for the sprocket wheel or wheels. It is a further object of the invention to provide means whereby damage to the film or projector caused by certain events which may occur during change-over from one frame frequency to another may be effectively prevented.

These and other objects of the invention, and the means used in accordance with the invention to achieve such objects, as defined in the appended claims, will be described in detail hereinafter, reference being had to the drawing which shows, by way of example, a perspective partial view of a projector embodying the invention. The drawing is schematic and shows only those parts of the projector which may be essential for a full understanding of the invention.

The optical arrangement of the projector shown includes a light source 1, a reflector 2, a condenser 3, a film gate 4 and an objective 5. The film 6 is drawn from a supply spool (not shown) and fed to a take-up spool (likewise not shown) by sprocket wheels 7 and 11, 12, respectively, which are positioned in the path of the film before and after the film gate 4, respectively, and by a plate-shaped claw 10 having pins 8 and 9 to enter into the perforations of the film. An electric motor 14 drives through its shaft 15 the three blade shutter 13 at a continuous rate which may be controllable e.g. by means of a series resistor. The same shaft 15 also carries an eccentric 16 rotating between sliders 17 and 18 and thereby causing the claw 10 to oscillate about its pivot center 19 whereby the pins 8 and 9 periodically describe a slightly curved path parallel to the film. The frequency of this oscillating motion is equal to the number of revolutions per second of shaft 15. The frequency of the other motion of the claw pins, i.e. a motion to and away from the film, which equals the frame frequency, can be varied, however, by means of the speed selection mechanism now to be described.

A worm 20 is secured to shaft 15 and drives by means of a worm wheel 21 which is fixed on shaft 22 an assembly of seven cam discs 23. This assembly is slidable along the shaft 22 by the aid of a fork 24, but cannot rotate relative to the shaft. The cam discs form a selection means for setting the various frame frequencies possible with this projector. The first cam disc has twelve recessions separated by cams, the second cam disc six, the third cam disc four, the fourth disc three, the fifth disc two, the sixth disc one whereas the seventh cam disc is circular with a radius corresponding to the cams of the remaining discs. The recessions of each of the discs are regularly spaced along the circumference and one of the recessions of the first disc is axially aligned with one of the recessions of each of the following five discs. A sensing roller 25 which is rotatable about a spindle 26 carried by a lever 27 may follow the profile of a selected one of the cam discs and is pressed against such a disc by a spring 28. The lever 27 is thereby made to oscillate at a frequency determined by the number of recessions of the selected cam disc. This oscillation is passed on to two further levers 30 and 31 by the hollow shaft 29 which surrounds shaft 42. The motion of lever 31 is transmitted to the claw 10 by means of the rod 32 and the associated drawing spring 33 mounted thereon. The spring 33 is fixed at one end to the lever 31 and at the other end to the claw 10 so as to secure that the rod 32 has its ends always tightly pressed against the lever 31 and the claw 10, respectively.

The transmission ratio between the motor shaft 15 and shaft 22 is 12:1. Accordingly, if shaft 15 is driven at 24 revolutions per second shaft 22 completes two revolutions per second. The flicker frequency of the three blade shutter then amounts to 72 per second. The claw 10, in this case, is twenty-four times per second in each of the extreme positions of its oscillatory movement parallel to the film plane. If the sensing roller 25 is made to follow the cam disc having twelve recessions, the rod 32 will be moved to and away from the film plane twenty-four times per second. Consequently, the pins 8 and 9 will enter into the film perforations the same number of times and the frame frequency will be twenty-four frames per second. If the roller 25, on the contrary, is following e.g. the cam disc having four recessions, the lever 27 and the rod 32 will complete their reciprocating movements only eight times per second. Thus, the frame frequency is then only eight frames per second, although the frequency of the vertical movement of the claw 10 is still twenty-four per second, as it was in the first case. The speed of the vertical movement of the claw 10 remains unchanged.

With the supposed speed of the motor of twenty-four revolutions per second the seven cams discs above described permit selection of the frame frequencies 24, 12, 8, 6, 4, 2 and 0 images per second. If the disc having no recessions is used the claw pins are prevented from entering the film perforations so that the film is stationary. In this case one and the same film frame will be projected for any period desired. If one desires to project the next image one can switch over e.g. to the disc having one recession and, after the film has been shifted one step, switch back to the circular disc. In this way the so-called single-frame projection is possible with the arrangement described. With a different speed of the motor other frame frequencies may be obtained, e.g. with sixteen revolutions per second the frame frequencies 16, 8, 5⅓, 4, 2⅔, 1⅓ and 0 frames per second.

In order that the film feed mechanism functions satisfactorily it is essential that the sprocket wheels 7, 11 and 12 displace the film always the same distance as the claw pins. To secure this, according, to the invention, a gear wheel 34 is provided to which a slip clutch 35 is secured. The gear wheel 34 which is in mesh with the gear wheel 21 on shaft 22 is rotatably supported by shaft 36. The transmission ratio between the two gear wheels 21 and 34 is 1:1. On the shaft 36 a ratchet wheel 37 is fixedly mounted. The gear wheel 34 by slip clutch 35 is allowed to slip relative to the ratchet wheel 37 if the latter is locked. If, on the contrary, the ratched wheel 37 is released the slip clutch 35 constitutes a driving connection between the ratchet wheel 37 and the gear wheel 34. The ratchet wheel 37 is locked and unlocked by a ratchet lever 30 whose motions are derived from the cam disc assembly 23. When the sensing roller 25 enters a recession of one of the cam discs, the lever 27 and, consequently, levers 30 and 31 move to the left. As described before, lever 31 transmits this motion to the claw pins 8 and 9, which draw the film past the film gate. Lever 30 at the same time unlocks the ratched wheel 37 and slip clutch 35 couples the ratchet wheel 37 which is fixed on shaft 36 to the gear wheel 34. On shaft 36 the sprocket wheel 11 is mounted. In order to drive the other sprocket wheels at the same time as sprocket wheel 11 a pulley 37' is mounted on shaft 36 which drives by means of a rope 38 and pulleys 39 and 40, shaft 42 of sprocket wheel 7 and the shaft 41 of sprocket wheel 12. Shaft 42 is received by the hollow shaft 29.

When the sensing roller 25 has passed the lowest point of the recession the levers 27, 30 and 31 move back to the right. Lever 31 transmits this motion to the claw pins which thereby are retracted from the perforations. Lever 30 arrests the next notch on ratchet wheel 37 so that the latter is no longer turned by gear wheel 34. The shaft 36 and the three sprocket wheels 7, 11 and 12 are thus stopped after a rotation through an angle corresponding to the height of one frame.

The axial shift of the cam disc assembly 23 is brought about by means of the fork 24 which lies between the first cam disc and a flange. If the projector is to be switched over from one frame frequency to another first the knob 43 must be pushed in. This knob is adapted to receive a cylindrical part 44 of a rod 45 and is provided with a number of axially extending interior slots whereas the cylinder 44 has similar slots. If knob 43 is turned without being pushed in at the same time cylinder 44 will not be engaged.

Rod 45 is provided with a screw thread of large pitch and is supported by a bearing 46 of the projector housing (not shown). In fork 24 a corresponding screw thread has been tapped.

When knob 43 is pushed an electrical contact 50 carried by a strip 47 will be actuated and contacts 49 and 50 close an A.C. circuit in which a coil 48 is energized. Coil 48 attracts the armature 51 which is connected to the lever 52 which is rotatable about spindle 53. Lever 52 is loaded by a spring 54. The lever carries a strip 55 which will be inserted into the path of the upward extension of lever 27 at the first time after coil 48 is energized that the sensing roller 25 arrives on a cam of a cam disc. Strip 55 is bevelled at its left side and fits into a correspondingly bevelled edge 56 of the extension of lever 27. If the coil 48 is not energized, the strip 55 by means of the spring 54 is kept out of the way of lever 27. The switching action now is as follows:

After knob 43 is pushed, lever 27 is locked by lever 52 as soon as the sensing roller 25 has arrived on a cam of the cam disc in operation. The sensing roller then is no longer permitted to enter the recessions of the cam disc and no film transport occurs. By turning knob 43 the cam disc assembly is now shifted along the shaft 22 until the cam disc adapted to give the desired new frame frequency is opposite the sensing roller 25. When the shifting is completed knob 43 is released and the coil 48 is de-energized. The locking of lever 27 is maintained, however, until the sensing roller 25 arrives at the next cam of the cam disc which has just been selected. At this time lever 27 is turned a small angle to the left so that the bevelled edge 56 is allowed to slip past the strip 55.

The switching action may be done while the projector is in operation. The locking of lever 27 during switching has for purpose to avoid any feeding of the film by the sprocket wheels without the claw 10 coming to action at the same time. The sensing roller 25, at the time of changing-over, could be on a cam of a cam disc and suddenly enter a recession of the following cam disc. This would involve a release of the ratchet wheel 37 by lever 30 for one step of the sprocket wheels. The film is not drawn past the film gate at the same time, however, since the claw though it is drawn towards the film by lever 31 will not be in a position to have its pins enter the perforations. The pins at this time will be approximately in the middle of their vertical stroke and will generally not find any perforations opposite themselves at this place. Thus the film loop on one side of the film gate might get lost after a number of speed changes which would cause film rupture or other damage. By avoiding, during the switching to other speeds, any film feeding by the sprocket wheels as well as by the claw such damage is effectively avoided.

After the foregoing description it will be clear that by reversing the driving motor 14 the film may be fed in the reverse direction without any substantial change in the operation of the device.

It will be appreciated, furthermore, that within the scope of the invention as defined by the appended claims, many changes may be applied by those skilled in the art to the example illustrated and described. More particularly, attention may be drawn to the possibility to use for the film transport past the film gate, instead of the claw as shown, a sprocket wheel provided in the vicinity of the film gate. Such an adidtional sprocket wheel may be driven by essentially the same means as the sprocket wheels shown in the drawing.

We claim:

1. A cinematographic projector comprising a film gate, a rotatable shutter having at least one blade movable past said gate intermittently to interrupt a light beam passing therethrough, drive means to rotate said shutter, a film feed mechanism to effect step by step movement of the film one frame at a time past said gate, said film feed mechanism comprising a cam assembly comprising a plurality of axially aligned cams each having a different number of actuating regions, each region of length corresponding to one frame of the film, means controlled by said drive means to rotate said cam assembly, a pivoted lever having a cam engaging surface adapted to be engaged by the actuating regions of a selected one of said cams upon rotation thereof, a film drive sprocket wheel engaging said film to advance the latter, a shaft on which said sprocket wheel is secured, a ratchet wheel secured to said shaft, a slip clutch mounted on said shaft and adapted to engage said ratchet wheel to rotate the shaft and the sprocket wheel thereon, means operatively connected to said drive means to rotate said slip clutch and means controlled by the movement of said pivoted lever to effect intermittent rotation of said ratchet wheel and said shaft and sprocket wheel to advance said film one frame as said cam engaging surface of said lever engages an actuating region of the selected cam.

2. The combination set forth in claim 1 in which said film feed mechanism comprises a claw comprising a plate pivoted at one end and having pins at its other end adapted to engage perforations of the film, said claw being movable longitudinal of the film and toward and away from the latter, means controlled by the drive means to effect longitudinal reciprocation of the claw in synchronization with the rotation of the shutter, means controlled by pivotal movement of said lever to effect movement of said claw toward and away from the film in synchronization with the rotation of said sprocket wheel by said ratchet wheel whereby when the pins engage the perforations in the film, the latter will be advanced one frame, means to effect movement of said cam assembly to locate one of said plurality of cams in alignment with said lever, and means to lock said lever to prevent pivotal movement thereof when said cam assembly is moved thereby to prevent movement of the film during such movement of the cam assembly.

3. The combination set forth in claim 2 in which a shaft is provided rotated by said drive means, said cam assembly is slidably mounted on said shaft to rotate therewith, a slidable member is operatively connected to said cam assembly to effect axial movement thereof, a control member is provided having a first and second position, said lever has a locking detent, means controlled by movement of said control member to the first position to effect engagement of said locking detent to prevent movement of said lever thereby restraining movement of said ratchet wheel and means controlled by movement of the control member to the second position to effect movement of the cam assembly.

4. The combination set forth in claim 3 in which a solenoid is provided having a locking member adapted to engage said detent on said lever and a switch is controlled by movement of said control member to said first position to energize said solenoid.

5. The combination set forth in claim 2 in which a second lever is operatively connected to said first lever on the same axis and movable therewith, said second lever having a ratchet tooth at its free end adapted to engage said sprocket wheel when said cam engaging surface of said first lever engages one of said actuating regions.

6. The combination set forth in claim 5 in which a third lever is operatively connected to said first two levers on the same axis and movable therewith, said third lever being operatively connected to said claw to effect movement of the latter to bring the pins thereof out of engagement with the perforations in the film when said ratchet tooth on said second lever engages said ratchet wheel.

References Cited in the file of this patent

UNITED STATES PATENTS

| 1,833,371 | Owens | Nov. 24, 1931 |
| 2,233,839 | Heurtier | Mar. 4, 1941 |

FOREIGN PATENTS

| 812,020 | Great Britain | Apr. 15, 1959 |